US012117236B2

(12) United States Patent
Kroes et al.

(10) Patent No.: US 12,117,236 B2
(45) Date of Patent: Oct. 15, 2024

(54) METHOD AND SYSTEM FOR PROVIDING AN INDICATION OF A SYSTEM OPERATING STATUS OR LOGISTICAL OPERATION STATUS OF A SELF-CONTAINED CLIMATE CONTROLLED STORAGE UNIT

(71) Applicant: THERMO KING LLC, Minneapolis, MN (US)

(72) Inventors: Paul J. Kroes, Eden Prairie, MN (US); Jason Tilghman, Minneapolis, MN (US); Ryan Wayne Schumacher, Bloomington, MN (US); Matthew Srnec, Minnetonka, MN (US); Srinivasa Rao Koppineedi, Eagan, MN (US)

(73) Assignee: THERMO KING LLC, Minneapolis, MN (US)

( * ) Notice: Subject to any disclaimer, the term of this patent is extended or adjusted under 35 U.S.C. 154(b) by 0 days.

(21) Appl. No.: 18/056,502

(22) Filed: Nov. 17, 2022

(65) Prior Publication Data

US 2024/0167761 A1 May 23, 2024

(51) Int. Cl.

| | |
|---|---|
| ***F25D 29/00*** | (2006.01) |
| ***G08B 7/06*** | (2006.01) |
| ***G08B 21/18*** | (2006.01) |

(52) U.S. Cl.

CPC ......... *F25D 29/003* (2013.01); *F25D 29/008* (2013.01); *G08B 7/06* (2013.01); *G08B 21/18* (2013.01)

(58) Field of Classification Search

CPC .......... G08B 7/06; G08B 21/00; G08B 21/18; G08B 21/185; G08B 21/187; G08B 21/20;

(Continued)

(56) References Cited

U.S. PATENT DOCUMENTS

| | | | |
|---|---|---|---|
| 7,714,708 | B2 | 5/2010 | Brackmann et al. |
| 10,875,497 | B2 | 12/2020 | Srnec |

(Continued)

FOREIGN PATENT DOCUMENTS

| | | |
|---|---|---|
| CA | 3070460 | 2/2019 |
| CN | 106500427 | 3/2017 |
| KR | 10-2015-0007636 | 1/2015 |

OTHER PUBLICATIONS

Extended European Search Report, issued in the corresponding European patent application No. 23210540.3, dated Mar. 20, 2024, 7 pages.

*Primary Examiner* — Brian Wilson
(74) *Attorney, Agent, or Firm* — HSML P.C.

(57) ABSTRACT

An electrically powered portable self-contained climate controlled storage unit that includes a base including an enclosure, in which the base is configured to support the self-contained climate controlled storage unit, a climate controlled space affixed above the base, and a climate control system for providing climate control to the climate controlled space. The climate control system is provided in the enclosure. The storage unit further includes at least one status indication light provided around a perimeter of at least one surface of the self-contained climate controlled storage unit. The system controller is connected to the self-contained climate controlled storage unit, and is configured to operate the at least one status indication light based on at least one of a system operation status of the self-contained climate controlled storage unit or a logistical operation status of the self-contained climate controlled storage unit.

17 Claims, 7 Drawing Sheets

(58) Field of Classification Search
CPC .............. G06Q 10/0832; B60H 1/3232; F25D 29/003; F25D 29/008; F25D 16/00; F25D 19/003
See application file for complete search history.

(56) References Cited

U.S. PATENT DOCUMENTS

| | | | | |
|---|---|---|---|---|
| 10,951,047 | B2 | 3/2021 | Neeld | |
| 2004/0226309 | A1* | 11/2004 | Broussard | F25D 11/003 62/236 |
| 2005/0029149 | A1* | 2/2005 | Leung | B65D 81/3816 206/524.8 |
| 2018/0100682 | A1* | 4/2018 | Nilsen | F25D 16/00 |
| 2018/0347896 | A1 | 12/2018 | Eddy et al. | |
| 2019/0277561 | A1* | 9/2019 | Spath | B65D 81/18 |
| 2022/0012684 | A1* | 1/2022 | Skaaksrud | H04W 4/023 |
| 2023/0110148 | A1* | 4/2023 | Davis | G06Q 10/0833 705/333 |

* cited by examiner

METHOD AND SYSTEM FOR PROVIDING AN INDICATION OF A SYSTEM OPERATING STATUS OR LOGISTICAL OPERATION STATUS OF A SELF-CONTAINED CLIMATE CONTROLLED STORAGE UNIT

CROSS-REFERENCE TO RELATED APPLICATIONS

This application provides disclosures related to co-pending applications XXX, which are incorporated by reference.

FIELD

This disclosure relates generally to a self-contained climate controlled storage unit. More particularly, the disclosure relates to a method and system for providing an indication of a system operating status or of a logistical operation status of the self-contained climate controlled storage unit.

BACKGROUND

A self-contained climate controlled storage unit, such as a refrigerated air freight container (e.g., Air100-RKN and AIR200-RAP from Thermo King and Envirotainer®, etc.), a portable refrigeration container (e.g., ColdCube™ container from Thermo King, Coldtainer® from Thermo King, etc.), etc., provides portable climate controlled storage for cargo (e.g., produce, frozen foods, pharmaceuticals, etc.). In some instances, the cargo can be high value/critical cargo. Self-contained climate controlled storage units are typically battery powered. The battery typically requires charging prior to transport so that the unit can provide and maintain climate control (e.g., temperature, humidity, pressure, etc.) without relying on external power. In many instances, regulatory agencies (e.g., Federal Aviation Administration—FAA, etc.) and trade associations (e.g., International Air Transport Association— IATA, etc.) provide regulations that impose strict performance specifications on self-contained climate controlled storage units. Failure to meet these regulations can result in refusal of certification and entry into, for example, an aircraft.

SUMMARY

This disclosure relates generally to a self-contained climate controlled storage unit. More particularly, the disclosure relates to a method and system for providing an indication of a system operating status or of a logistical operation status of the self-contained climate controlled storage unit.

In an embodiment, the self-contained climate controlled storage unit includes a status indication light extending along an edge of a surface of the self-contained controlled storage unit to provide high visibility of the status indication light. For example, in an embodiment, the status indication light can be provided around the entirety or near-entirety, e.g., at least 90%, of the perimeter edge of the top surface of a climate controlled space of the self-contained climate controlled storage unit.

In an embodiment, an electrically powered portable self-contained climate controlled storage unit is provided. The storage unit includes a base having an enclosure, in which the base is configured to support the self-contained climate controlled storage unit, a climate controlled space affixed above the base, a climate control system for providing climate control to the climate controlled space, at least one status indication light extending along an edge of a surface of the self-contained climate controlled storage unit, and a system controller configured to operate the at least one status indication light based on at least one of a system operation status of the self-contained climate controlled storage unit or a logistical operation status of the self-contained climate controlled storage unit.

In another embodiment, a method for managing logistical operation for an electrically powered portable self-contained climate controlled storage unit is provided, in which the electrically powered portable self-contained climate controlled storage unit includes a base having an enclosure, a climate controlled space affixed above the base, a climate control system for providing climate control to the climate controlled space, the climate control system provided in the enclosure, at least one status indication light extending along an edge of a surface of the self-contained climate controlled storage unit, and a system controller configured to control operation of the electrically powered portable self-contained climate controlled storage unit. The method includes the system controller notifying a logistics operator that the self-contained climate controlled storage unit is ready for deployment, in which the notifying the logistics operator includes operating the at least one status indication light to indicate that the self-contained climate controlled storage unit is mission ready. The method further includes after the self-contained climate controlled storage unit is transported to a deployment site, the system controller notifying the logistics operator that the self-contained climate controlled storage unit has been unloaded, in which the notifying the logistics operator includes the system controller operating the at least one status indication light to indicate that the self-contained climate controlled storage unit is mission complete. Additionally, the method includes after the self-contained climate controlled storage unit is received from the deployment site and prepared for redeployment, the system controller notifying the logistics operator that the self-contained climate controlled storage unit is ready for the deployment.

As such, the electrically powered portable self-contained climate controlled storage unit has at least the following advantages over prior storage units.

The self-contained climate controlled storage unit has a highly visible status indication light that is able to communicate a variety of container operation statuses including faults through various colors and flashing sequences. For example, the status indication light can be used to indicate power failure, operational faults, system errors, or the like that can risk operational efficiencies and result in cargo spoilage.

The self-contained climate controlled storage unit has a highly visible status indication light to reduce or remove unintended dwell time when in storage, at the deployment site, mid-route, or other point in the reverse logistics process. For example, the storage unit can include battery status and a ready for deployment status including having a mission complete and mission ready indication that provides a logistical operation status of the self-contained climate controlled storage unit via the status indication light and/or notification to the logistics operator.

The self-contained climate controlled storage unit is also able to self-monitor its operational status, operational faults, system errors, logistic operation, and the like and send information or alerts to the logistics operator based on triggering events. As such, the logistics operator can take appropriate actions to correct the fault or error and/or improve the logistical operational efficiency of the self-contained climate controlled storage unit.

BRIEF DESCRIPTION OF THE DRAWINGS

References are made to the accompanying drawings that form a part of this disclosure and which illustrate the embodiments in which systems and methods described in this specification can be practiced.

Like reference numbers represent like parts throughout.

DETAILED DESCRIPTION

Figure 1:
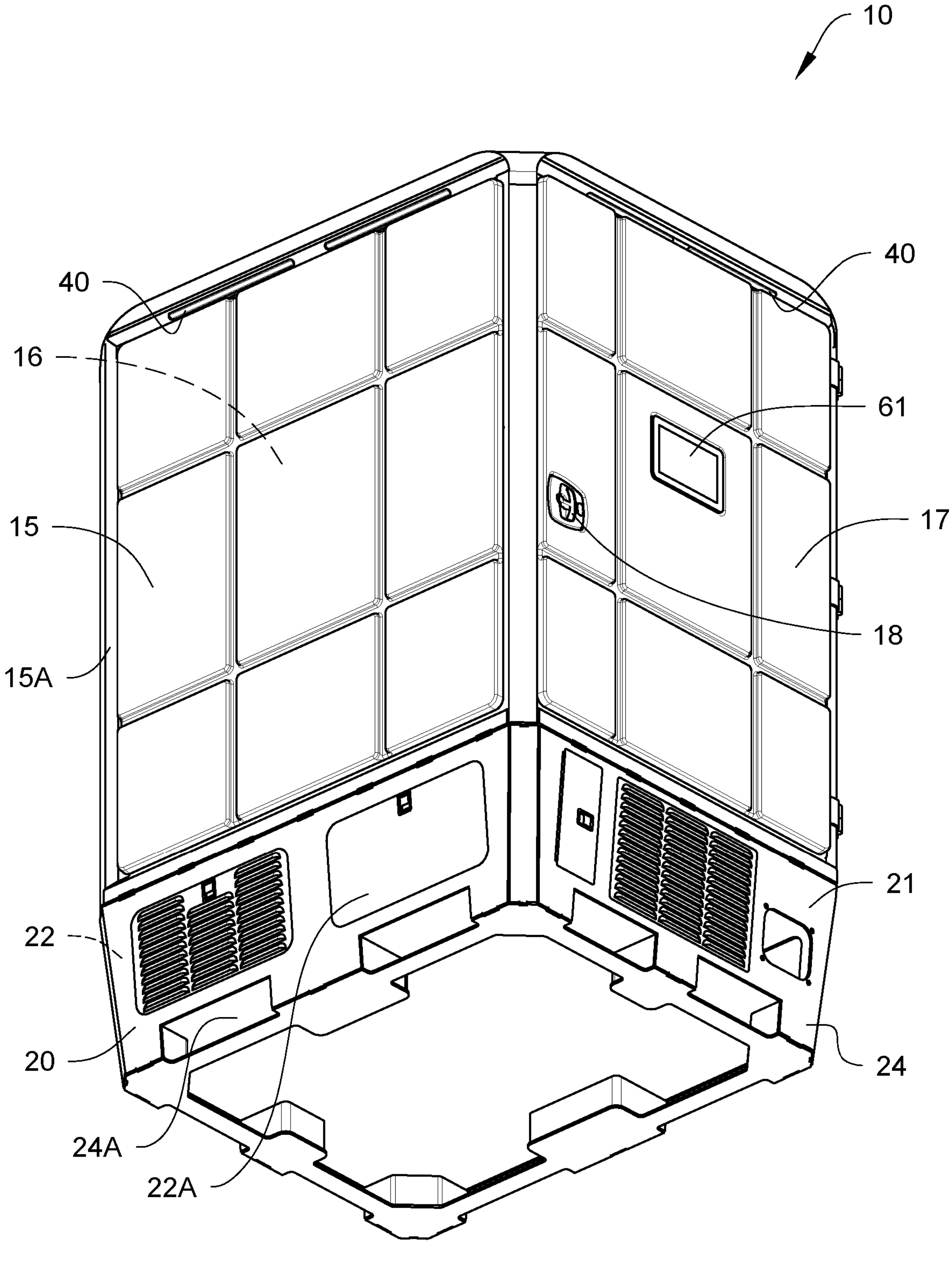
FIG. 1 illustrates a self-contained climate controlled storage unit, according to an embodiment.

This disclosure relates generally to a self-contained climate controlled storage unit. More particularly, the disclosure relates to a method and system for providing an indication of a system operating status or of a logistical operation of the self-contained climate controlled storage unit.

It is noted that: U.S. application Ser. No. 18/056,467, "METHOD AND SYSTEM FOR MONITORING WEIGHT/ORIENTATION OF A SELF-CONTAINED CLIMATE CONTROLLED STORAGE UNIT AND ADJUSTING OPERATION BASED ON THE MONITORED WEIGHT/ORIENTATION,"; U.S. Application Number 29/868048 "ELECTRICALLY POWERED PORTABLE SELF-CONTAINED CLIMATE CONTROLLED STORAGE UNIT,"; U.S. application Ser. No. 18/056,488, "METHODS AND SYSTEMS FOR POWER SHARING AND CHARGING COORDINATION OF SELF-CONTAINED CLIMATE CONTROLLED STORAGE UNIT(S),"; and U.S. application Ser. No. 18/056,498, "METHODS AND SYSTEMS FOR CLEANING AN ELECTRICALLY POWERED PORTABLE SELF-CONTAINED CLIMATE CONTROLLED STORAGE UNIT,"; and all filed concurrently herewith on Nov. 17, 2022, and the contents of which are incorporated herein by reference.

The terms "above", "below", "top", "bottom", "left", "right", and the like described in the present application are defined according to the typical observation angle of a person skilled in the art and for the convenience of the description. These terms are not limited to specific directions but provided for ease of understanding the disclosure. As such, the terms should be interpreted broadly and can include, but not limited to, being directly adjacent, near, or spaced apart from the respective components.

A self-contained climate controlled storage unit, such as a refrigerated air freight container (e.g., Thermo King Air 100-RKN, etc.), a portable refrigeration container (e.g., Thermo King Cold Cube' containers, Thermo King Coldtainer®, etc.), etc., provides portable climate controlled storage for cargo (e.g., produce, frozen foods, pharmaceuticals, biologicals, for example, human tissue, blood, heart, and lung, etc.). In some instances, the cargo can be high value/critical cargo. These self-contained climate controlled storage units are typically battery powered. A self-contained climate controlled storage unit, as defined herein, is capable of autonomous operation (e.g., for a week or more) via battery power. Each of the self-contained climate controlled storage units can be recharged by plugging into an external power source, e.g., an electrical outlet to shore power or external battery or electrical generator. As such, it is beneficial to have a self-monitoring storage unit that can communicate a variety of container statuses, faults/errors, logistical operations, or the like such that a user or logistical operator can decide on the use and/or a course of action, if attention is required, for the storage unit.

The systems and methods described herein are directed to an electrically powered self-contained climate controlled storage unit that can be transported in a climate controlled or non-climate controlled transport unit, such as, airplanes, railways, trucks, vans, trailers, intermodal containers, or other similar transport units, and that can self-monitor container statuses, faults/errors, logistical operations, or the like associated with the storage unit during transport and/or handling. The self-contained climate controlled storage unit includes at least one status indication light extending along an edge of a surface of the self-contained climate controlled storage unit that is operated by a system controller.

In an embodiment, the system controller is configured to operate the at least one status indication light based on at least one of a system operation status of the self-contained climate controlled storage unit or a logistical operation status of the self-contained climate controlled storage unit. The system operation status of the self-contained climate controlled storage unit can include statuses including a battery state of charge, whether the storage unit is in an idle state or active state, an alarming event, such as a door open event, power loss, or a critical event that can result in spoilage to the cargo or damage to the storage unit. The logistical operation status can include a mission ready status indication to communicate that the storage unit is ready for deployment or a mission complete status indication to communicate that the storage unit had completed the deployment operation and ready to be retrieved or collected. As such, the system controller can be used to provide information and/or alerts related to the storage unit during transport and/or handling and to alert a user or logistical operator if any potentially hazardous conditions may occur during the transport and/or handling or other aspects included in the logistical operation of the storage unit.

While some of the embodiments discussed below are discussed with respect to a freight container, one skilled in the art would recognize the embodiments discussed herein can be provided for any type of electrically powered self-contained climate controlled storage unit (e.g., air freight containers, portable refrigerated storage boxes, etc.).

Figure 2:
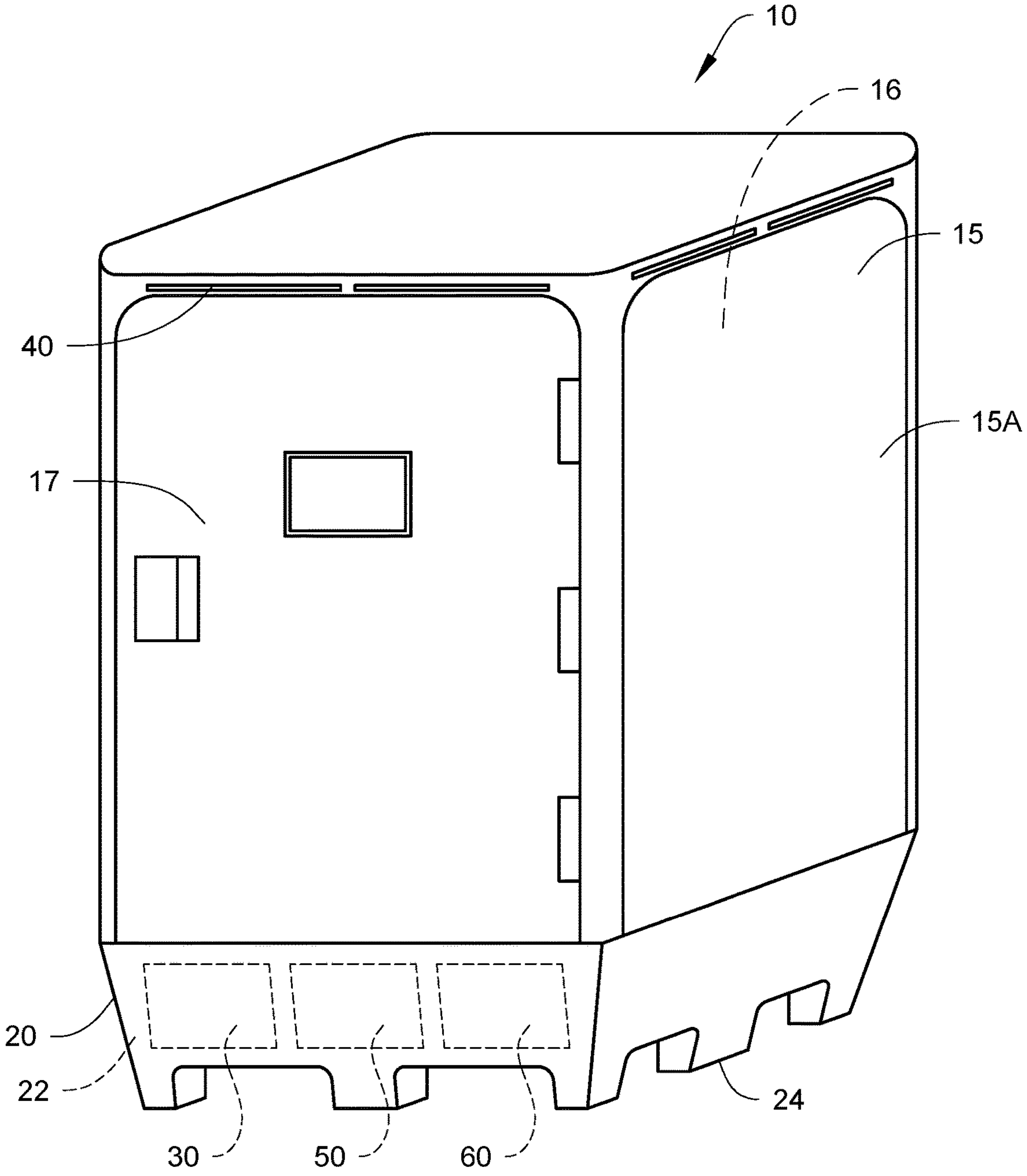
FIG. 2 is a schematic illustration of the components of a self-contained climate controlled storage unit, according to an embodiment.

FIG. 1-2 illustrates a self-contained climate controlled storage unit 10 and FIG. 2 is a schematic illustration to show components of the self-contained climate controlled storage unit 10, according to an embodiment. The storage unit 10 includes a climate controlled space 15 and a base 20. The climate controlled space 15 is affixed above the base 20, e.g., vertically above the base 20, either directly above or to the side of the base 20. The storage unit 10 also includes a climate control system 30 for cooling and/or heating the climate controlled space 15, at least one status indication light 40 provided around a perimeter of at least one surface of the storage unit 10, and a system controller 50 connected to the storage unit. As shown in FIG. 2, the storage unit also includes a power source 60 for supplying power to the climate control system 30.

The climate controlled space 15 includes an insulated housing 15A having an interior space 16 for storing cargo. In the illustrated embodiment, the insulated housing 15A can include insulated side, bottom, and top walls configured to generally conform to the shape required of the storage unit 10. Access to the interior space 16 can be provided via door 17 for enclosing and/or accessing the cargo. The door 17 can be kept closed by securing mechanism 18. The securing mechanism 18 can be a handle, knob, pull handle, turn handle, or the like connected to a lock, and can be operable and accessible via keypad, biometrics, web, key card, mobile, a combination of the same, or the like.

In an embodiment, the climate controlled space 15 can have a width of about 30 inches to 60 inches, or at about 42 inches for accommodating a standard pallet in the interior space 16. The height of the climate controlled space 15 can be between 36 inches and 120 inches, or between 36 inches and 72 inches, since at larger heights, the center of gravity of the storage unit 10 may be higher and could be prone to tipping. It is understood that such disclosure is not intended to be limiting in scope, but provided for understanding the disclosure.

The base 20 includes a housing 21 having an enclosure 22 and a plurality of feet 24 for supporting the storage unit 10. In the embodiment shown in FIG. 2, the enclosure 22 can include at least a portion of the climate control system 30, the system controller 50, and the power source 60. The enclosure 22 can be accessible via a panel or door 22A on the housing 21. In an embodiment, the plurality of feet is positioned to support the storage unit 10. The plurality of feet 24 is provided at least at the corners of the base 20 and/or at or along a center of the base 20 and/or along the edges of the base 20. Slots or openings 24A are provided between the plurality of feet 24. In some embodiments, the slots or openings 24A can have a width for accepting forks or tines of a forklift or for engaging other lifting and handling machines. In an embodiment, the plurality of feet 24 can include wheels or retractable wheels, e.g., manual, hydraulic, piston driven, or the like, to allow the moving or repositioning of the storage unit 10 without a lifting and handling machine.

The climate control system 30 can be configured to provide climate control (e.g., temperature, humidity, atmosphere, etc.) within the interior space 16. In particular, the climate control system 30 can provide climate control to maintain fresh and/or frozen cargo or provide heated storage for cargo stored within the interior space 16 via vents and/or communication channels or ducts through the walls of the storage unit 10. It will be appreciated that the particular cargo is not limiting. For example, in an embodiment, the cargo can include perishable items such as food, while in another embodiment the cargo can include pharmaceuticals, biologics, or medical equipment, blood, organs, or the like. In an embodiment, the climate control system 30 can include one or more climate control circuits (not shown). Each of the one or more climate control circuits can include, for example, a compressor, a condenser, an evaporator, and an expansion valve. In an embodiment, one or more condensers (not shown), one or more condenser fans (not shown), and one or more electrical components (e.g., valve(s)) (not shown) can be housed within the climate control system 30. There can also be one or more evaporators (not shown) and one or more evaporator fans (not shown) housed within one or both of the climate control system 30 and the interior space 16 to provide climate control within the interior space 16.

The system controller 50 can be configured to control and communicate with the storage unit 10, one or more electrical components, the at least one status indication light 40, and/or the climate control system 30, e.g., the compressor, the one or more condenser, and/or evaporator fans, etc. The system controller 50 can include a processor and memory for storing data and instructions. In an embodiment, the system controller 50 can be connected to a human machine interface (HMI) 61 that can be powered by the power source (e.g., as discussed below as power source 60). The HIM 61 can include a display, touchscreen, keypad, or the like as an interface for controlling or programming of the storage unit 10, displaying information related to the storage unit 10, or the like. In an embodiment, the information can include shipment details, weight, cargo, operation statuses, including battery power, alert/alarm conditions, temperature, humidity, or max and min temperatures, logical operation statuses, or the like. In an embodiment, the HMI is integrated with the securing mechanism 18 which can have a display for displaying such information.

The power source 60 can be configured to power the storage unit 10, the system controller 50, and/or the climate control system 30. The power source 60 can include a battery source (not shown), e.g., battery powered. The battery source can be supplied with an energy supply source when the self-contained climate controlled storage units are in the climate controlled transport unit or can be supplied with energy (i.e., charged/recharged) prior to being loaded and transported in a transport unit. The battery source can be configured to provide electrical energy to, for example, the system controller 50, the one or more electrical components, the compressor, the one or more condenser and/or evaporator fans, etc.

The battery source can include one or more battery banks (not shown) with a DC and/or AC charge input (not shown) configured to allow an external power source to charge the one or more battery banks. When charge input includes a DC charge input, the battery source can also include a DC charge controller, a DC isolation connection, and a DC disconnect switch. When the charge input includes an AC charge input, the battery source can also include an AC inverter, an AC charger, and an AC disconnect switch and a breaker panel.

The at least one status indication light 40 is configured to provide high visibility, e.g., having a brightness or luminosity that is discernible from any background, for the storage unit 10. The status indication light 40 can include a plurality of light sources including, but not limited to, light-emitting diodes, gas discharge bulbs, graphene bulbs, or the like. The at least one status indication light 40 can extend along an edge of a surface of the storage unit 10. The surface can include at least one of the top wall, side walls, base 20, door 17, or the like. For example, in an embodiment as seen in FIG. 1, the at least one status indication light 40 is provided substantially, e.g., at least 80% to about at least 95%, around a perimeter edge of the top wall or surface of the climate controlled space 15. As such, when the at least one status indication light 40 is activated, the storage unit 10 is highly visible, for example, when stored in a warehouse or trailer, to alert the customer or logistics operator of a system operation status and/or logistical operation status and/or location of the storage unit 10. It is appreciated that the placement of the status indication light 40 is not limited by this disclosure, but can be provided on the storage unit 10 to provide high visibility. For example, in an embodiment, the status indication light 40 can be provided around the perimeter edge of the door 17, around the perimeter edge of the base 20, around a wall of the climate controlled space, or other surface of the storage unit 10.

It is appreciated that in an embodiment, the status indication light 40 can also be provided to provide illumination. For example, the status indication light 40 can be manually operated to illuminate an area around the storage unit 10, e.g., with colored light or white light. In another embodiment, the status indication light 40 can be provided in the slots or openings 24A that are provided between the plurality of feet 24, such that light can be provided to guide the tines of the forklift or other loading/unloading machine.

It is appreciated that in an embodiment, the status indication light 40 can also be provided to provide location notification of the storage unit 10. For example, when the storage unit 10 is stored in a warehouse or large facility, the system controller 50 can be configured to operate the at least one status indication light 40 to locate the self-contained climate controlled storage unit, e.g., increase intensity or change color for identification in the warehouse or storage facility.

The storage unit 10 can also include additional components for the monitoring of the storage unit 10. For example, in an embodiment, the storage unit 10 can include a weight sensor, such as a load cell or pressure sensor, an orientation sensor, such as an inclinometer, an accelerometer or inertial monitor, or a temperature sensor, humidity sensor; or the like for monitoring the environmental conditions of the interior space 16 of the storage unit 10. In view of such various arrangements of the sensor(s), the sensor(s) can be used to measure and/or determine various conditions of the storage unit 10. The storage unit 10 can also include communication and telematics controllers and modules. For example, the storage unit 10 can include a global positioning system (GPS) module, radio frequency (RF) transceivers, USB interface, WiFi communications module, cellular communications modules, or other Internet accessible/enabled communication modules. As such, information for the storage unit 10, such as weight, temperature, location, faults, errors, or the like can be sent telematically, e.g., can be communicated to the logistics operator who can be a person that monitors, manages, or controls the transport and/or handling of the storage unit, and/or a customer. It is understood that the term telematics can be generally related to monitoring the storage unit using GPS technology or the like to track movement and/or providing communications with the user or customer via the Internet, cellular, or the like related to the shipping and/or handling of the storage unit and can include a GPS module, RF transceivers, USB interface, WiFi communications module, cellular communications modules, or other Internet accessible and communication modules. As such, the storage unit 10 can also be used as a beacon for location and ranging.

Figure 3A:
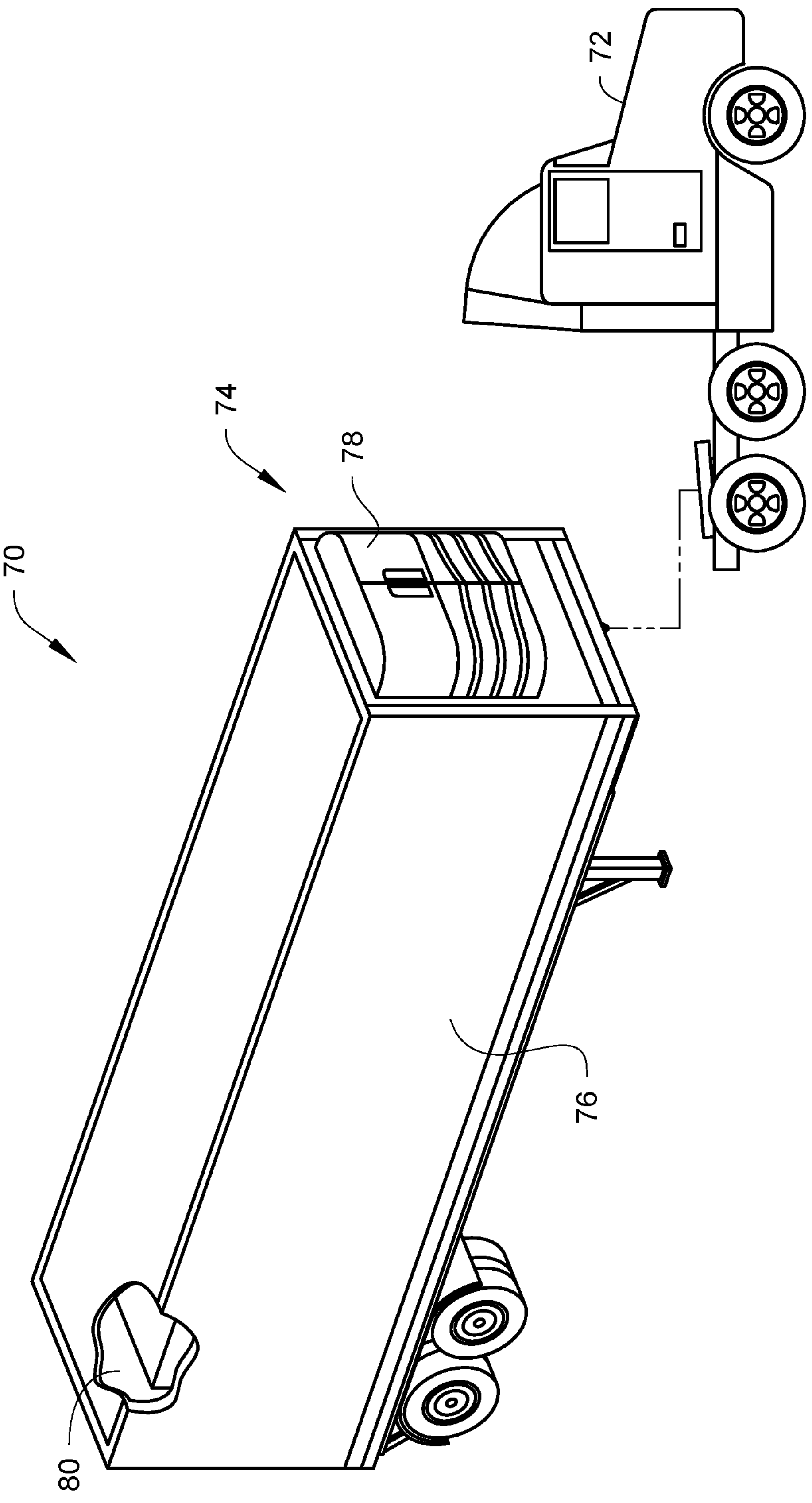
FIGS. 3A-3B illustrate a climate controlled transport unit having a trailer attached to a tractor, the trailer storing the self-contained climate controlled storage unit of FIGS. 1 and 2, according to an embodiment.
Figure 3B:
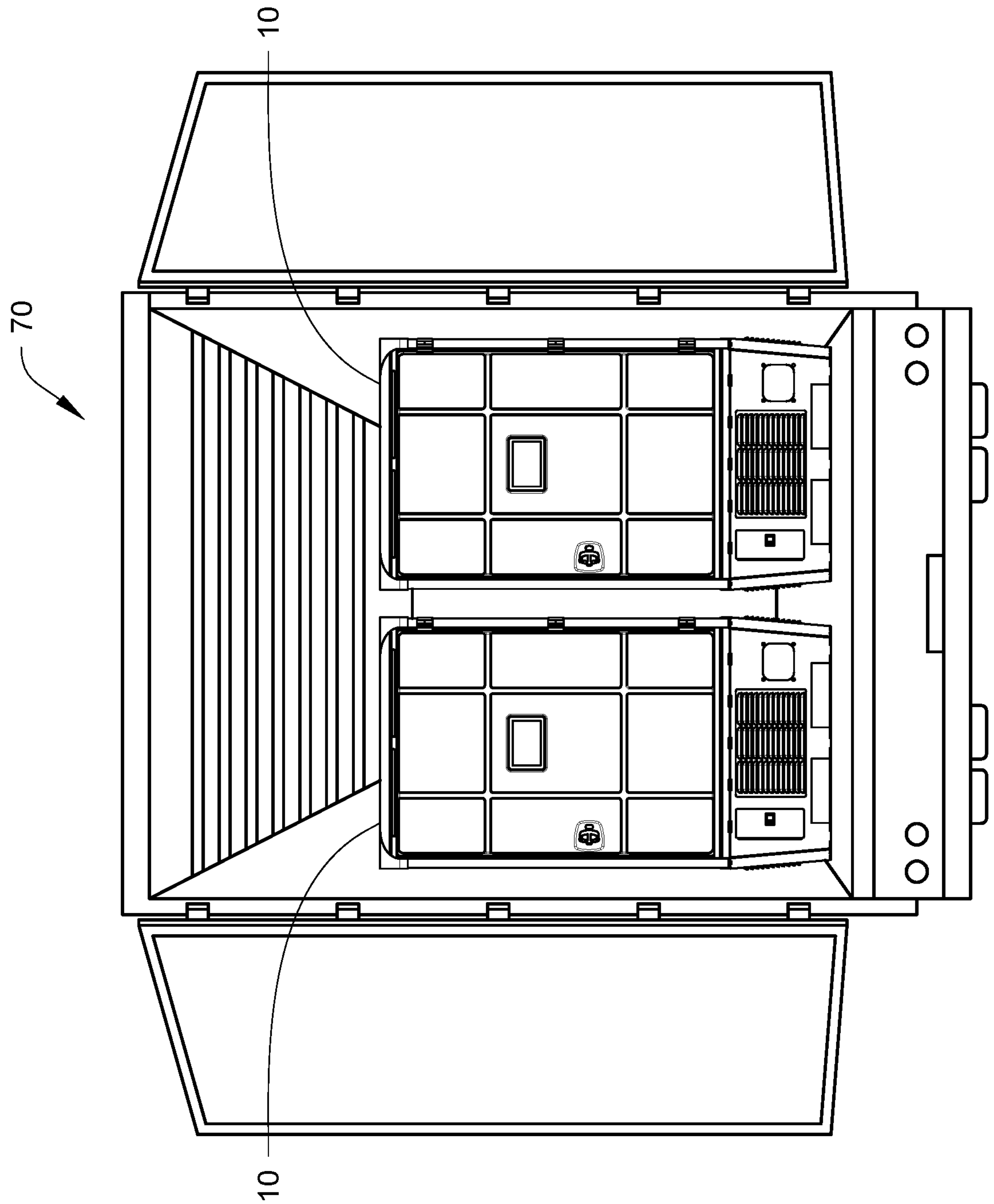

FIGS. 3A and 3B illustrate a transport unit 70 attached to a tractor 72, according to an embodiment. The transport unit 70 includes a transport climate control system (TCS) 74 and a transport unit 76. The TCS 74 can be configured to control a climate (e.g., temperature, humidity, atmosphere, etc.) of an internal space 80 of the transport unit 76. In particular, the TCS 74 can be configured to transfer heat between an internal space 80 and the outside environment. In some embodiments, the TCS 74 can be a multi-zone system in which different zones or areas of the internal space 80 are controlled to meet different climate control requirements based on the cargo stored in the particular zone. The TCS 74 can include a transport climate control unit (TCU) 78 for providing climate control within the internal space 80. The internal space 80 can store cargo including, for example, one or more self-contained climate controlled storage units 10. It is appreciated that while the transport unit 70 has been discussed as having the TCS 74, the disclosure is not intended to limit the scope. In an embodiment, the transport unit 70 can be a non-climate controlled transport unit 70. As such, the storage units 10 can provide the necessary climate control for individual cargo stored therein.

As seen in FIG. 3B, the storage units 10 can be placed and secured in the transport unit 70. It is appreciated that due to the dimensions of the storage unit 10, the storage units 10 can be placed side by side and front to back in the transport unit for compact packing and transport of the storage units 10. As such, the storage unit 10 can individually provide the climate control requirements for the cargo stored in each individual storage unit 10 based on the customer's needs.

Embodiments of systems and methods for operating the at least one status indication light of the self-contained climate controlled storage unit, such as the storage unit 10, are described in additional detail below.

Figure 4:
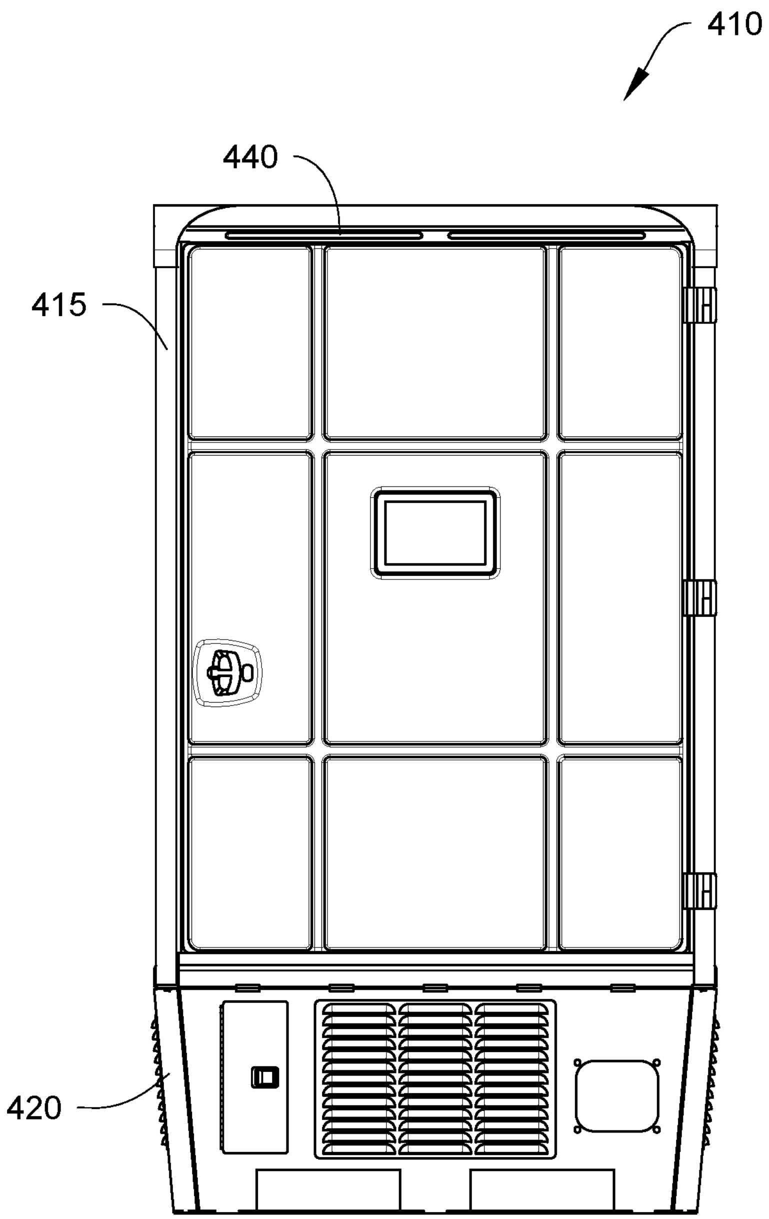
FIG. 4 illustrates a self-contained climate controlled storage unit, according to an embodiment.

FIG. 4 illustrates a storage unit 410, according to an embodiment. The storage unit 410 includes a climate controlled space 415 and a base 420. The climate controlled space 415 can be affixed above the base 420, e.g., vertically above the base 420. The storage unit 410 can also include a climate control system (e.g., climate control system 30 shown in FIG. 2) for cooling and/or heating the climate controlled space 415, at least one status indication light 440, and a system controller (e.g., system controller 50 shown in FIG. 2) connected to the storage unit 410. In an embodiment, the storage unit 410 can also include a power source (e.g., power source 60 shown in FIG. 2) for supplying power to the climate control system. In an embodiment, the status indication light 440 is provided extending along an edge of a surface of the climate controlled space 415, e.g., wrapped around a perimeter edge of the top wall or surface. As such, the status indication light 440 is highly visible to communicate a variety of container operational statuses including faults/errors of the storage unit 410 through various colors and/or flashing sequences.

In an embodiment, the system controller (e.g., system controller 50 shown in FIG. 2) can operate the status indication light 440 in at least two operation modes. In a first operation mode, the system controller of the self-contained climate controlled storage unit 410 can determine that the storage unit 410 is being operated in an idle operational state, e.g., based on temperature, weight (or no weight) of cargo in the storage unit, location, or the like. In the idle operational state, the system controller can be configured to monitor a battery state of charge of the one or more batteries of the power source (e.g., power source 60 shown in FIG. 2). The battery state of charge can include, for example, level of charge, battery health, or the like. The system controller can operate the status indication light 440 to emit different light depending on the battery state of charge. For example, when the battery state of charge is at a critically low level, e.g., less than 5% of charge, the system controller can operate the status indication light 440 to emit a solid red light. When the battery state of charge is at a low level, e.g., between 5% and 25% of charge, the system controller can operate the status indication light 440 to emit a solid yellow light. When the battery state of charge is at a medium level, e.g., between 25% and 75% of charge, the system controller can operate the status indication light 440 to emit a solid orange light. When the battery state of charge is at a high or full level, e.g., between 75% and 100% of charge, the system controller can operate the status indication light 440 to emit a solid green light. As such, the storage unit 410 provides a highly visible and intuitive operation of the status indication light 440 to allow a customer or logistics operator to determine which storage unit 410 needs attention, e.g., charging, or which storage unit 410 can be deployed or used at a customer deployment site. For example, in an embodiment, while a storage unit 410 that has a critically low level of charge should not be deployed, a storage unit 410 that has a low level of charge could be used for a short duration deployment that does not require the climate control system to cool at low temperatures. During such deployment, if the storage unit 410 emits a solid red light, the customer would be informed that the storage unit 410 needs charging and/or is no longer suitable for providing climate control, e.g., refrigeration, and can take the appropriate action, e.g., charge the storage unit 410 or notify the logistics operator.

In a second operation mode, the system controller can determine that the self-contained climate controlled storage unit 410 is being operated in an active operational state, e.g., based on temperature, temperature setpoint, weight of cargo in the storage unit, location, or the like. The system controller can be configured to monitor a battery state of charge of the one or more batteries of the power source (e.g., power source 60 shown in FIG. 2). The system controller can operate the status indication light 440 to emit different light depending on the battery state of charge. When the battery state of charge is at a critically low level, e.g., less than 10% of charge, the system controller can operate the status indication light 440 to emit a solid red light. When the battery state of charge is at a low level, e.g., between 10% and 25% of charge, the system controller can operate the status indication light 440 to emit a slow flashing yellow light. When the battery state of charge is at a medium level or at a high or full level, e.g., between 25% and 100% of charge, the system controller can operate the status indication light 440 to emit a solid blue light. As such, the storage unit 410 provides a highly visible and intuitive operation of the status indication light 440 to allow, for example, a customer or logistics operator to determine whether the storage unit 410 needs attention, e.g., charging or if perishable cargo needs unloading and/or shipment/transportation. For example, since the storage unit 410 operating in an active operational state to provide climate control, e.g., refrigeration at a set setpoint, requires more energy to control the climate control system than a storage unit 410 that is running in an idle operational state, the system controller can control the storage unit 410 to communicate the critically low level of charge using various colors and/or flashing, such that the customer is alerted of the critically low level and can contact the logistics operator or charge the storage unit 410, since cargo can be perishable if proper climate control is not provided. In another embodiment, a customer can program the storage unit 410 to show status of expiring loads, e.g., based on the perishable date and/or expiration date of the cargo. The storage unit 410 can provide a variety of colors and/or flashing sequences and/or include an audible alert to communicate the storage unit 410 operational status in order to communicate or alert the need for attention. As such, the storage unit 410 can be configured to provide a status indication to improve shipping time to save any perishable loads.

In another embodiment, the system controller (e.g., system controller 50 shown in FIG. 2) can operate the status indication light 440 to emit a warning signal when the self-contained climate controlled storage unit 410 is in an alarm condition or a critical operation condition. In the alarm condition, the status indication light 440 can be operated in a slow red light flashing in, for example, 2 second cycles, 4 second cycles, 8 second cycles, or 10 second cycles, and in the critical operation condition, the status indication light 440 can be operated in a rapid red light flashing, for example, 2 flashes per second, 4 flashes per second, or 8 flashes per second. For example, the alarm condition can include at least one of a door open event, setpoint deviation, failure of the one or more batteries, e.g., while the storage unit is in an active state, and failure of or imminent failure of the climate control system or component thereof. The door open event can be determined via sensors, switches, temperature readings, or the like and can be time dependent, e.g., alarms after 30 seconds, 1 minutes, 5 minutes, or 10 minutes. The setpoint deviation alarm condition can include a temperature setpoint and a determination of the deviation of the temperature in the climate controlled space 415 and the temperature setpoint for the storage unit 410. The failure of the one or more batteries can include the determination of the state of charge of the one or more batteries, e.g., the one or more batteries have a critically low level of charge, or a health indication of the battery(ies), e.g., charging health in relation to maximum charge value in which the batteries are no longer able to charge or charge to maximum capacity. The failure or imminent failure of the climate control system or component thereof can include the determination that the climate control system or component thereof has failed or is imminently about to fail. For example, the failure or imminent failure can be determined by the system controller based on the compressor or fan of the condenser not operating, e.g., no rotation of the shaft, the discharge temperature of the compressor being above a safety temperature threshold, a discharge pressure of the compressor being below a safety pressure threshold, or loss of power to the climate control system while the storage unit 410 is in the active state.

In an embodiment, the failure or imminent failure can also include the system controller (e.g., system controller 50) determining when the storage unit 410 is plugged into a power source and about to be transported or handled while still plugged into the power source. In an embodiment, the failure or imminent failure can further include the system controller determining whether the storage unit 410 is in an unsafe or unstable position, e.g., based on weight or inclinometer.

The critical operation condition can include determination by the system controller that the storage unit 410 has been damaged or potentially damaged, e.g., tipped over or been dropped that can be determined with an accelerometer or weight sensor which can damage the cargo, a determination that the storage unit 410 is not at a predetermined location, e.g., the deployment site, warehouse, or transport unit that can be determined with GPS, or determination that a measured value of the storage unit is not within a predetermined value. In determining whether the storage unit 410 is not at a predetermined location, GPS can be used by the system controller to identify the location of the storage unit 410. Since the transport of the storage unit 410 is predetermined, e.g., shipping logs, logistics tracking, or the like, when the storage unit 410 is not at the predetermined location, e.g., the customer/deployment site, the storage unit 410 can be considered in the critical operation condition. When determining whether the measured value is not within a predetermined value, the storage unit 410 can include weight sensors, in which the weight sensors can be used by the system controller to determine whether any of the components of the storage unit 410, e.g., batteries, or the cargo has been removed. In another embodiment, the critical operation can include the system controller determining whether the temperature in the climate controlled space 415 is above (or below) a predetermined range, e.g., 10 degrees above, of a maximum (or minimum) mean-kinetic temperature or average temperature, e.g., based on thermal loading of the cargo. In an embodiment, if the system controller determines that the storage unit 410 is in the critical operation condition, the self-ware storage unit 410 can automatically take an appropriate action, e.g., shutting down the climate control system or locking the door (e.g., door 17 in FIG. 1) or send notification to the customer or logistics operator and/or provide an audible or flashing alert.

While the light colors emitted by the status indication light 440 have been discussed above with respect to red, yellow, orange, green, and blue, and flashing sequences, it is appreciated that such disclosure is not intended to limit the scope, and various colors, flashing sequences, intensities, or the like can be used for indications for the different battery states or to provide the necessary indications or alerts. It is also appreciated that in an embodiment, an audible alert can also be provided if the system controller determines that the storage unit is in the critical operation condition.

As such, by providing a highly visible wrap-around-like status indication light 440, the storage unit 410 that has a finite runtime in view of the on-board power source, e.g., batter(ies), power failures, operational faults/errors, and alarms/errors that risk operational efficiencies and cargo spoilage are effectively and efficiently communicated to the user, customer, or logistics operator to take the necessary corrective actions based on the alarm, e.g., charging the storage unit, closing the door, removing cargo if imminent failure, inspection/repair of the storage unit, or the like. Additionally, at least in view of the wrap-around status indication light 440, the status indication light 440 is highly visible to communicate the container operational status, such that, the user, customer, or logistics operator can be readily alerted and decide on a course of action if attention is required by the storage unit. In so doing, the operational efficiency of the storage unit 410 is improved since the user, customer, or logistics operator can quickly and effectively ascertain the status of a single or multiple storage units from a distance and if necessary take action and more closely inspect the storage unit(s).

Additionally, since the storage unit 410 has full telematics visibility and tracking, the system controller can communicate any of the relevant information to the customer or logistics operator, e.g., weight, alarm conditions, critical operation conditions, temperatures, or the like.

Figure 5:
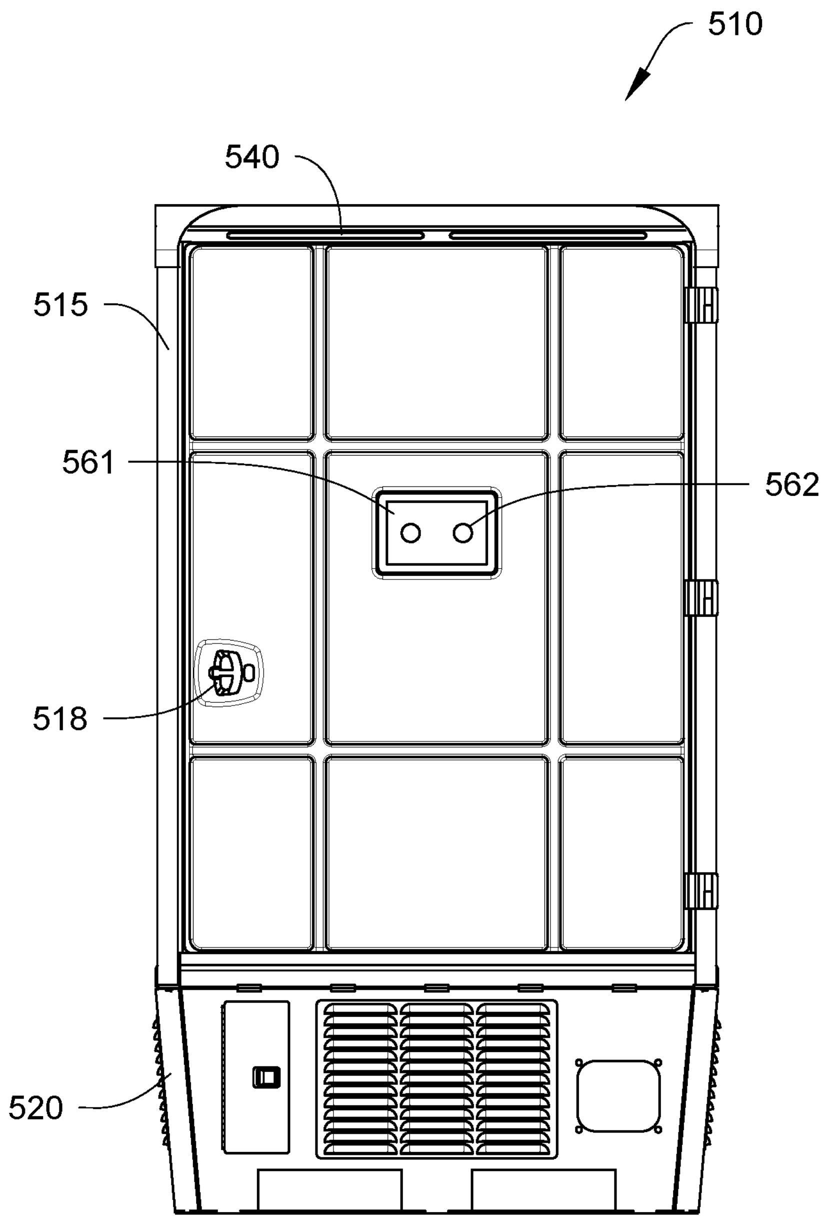
FIG. 5 illustrates a self-contained climate controlled storage unit, according to an embodiment.

FIG. 5 illustrates a storage unit 510 for use in a reverse logistics operation, in an embodiment. The storage unit 510 includes a climate controlled space 515 and a base 520. The climate controlled space 515 can be affixed above the base 520, e.g., vertically above the base 520. The storage unit 510 can also include a climate control system (e.g., climate control system shown in FIG. 2) for cooling and/or heating the climate controlled space 515, at least one status indication light 540, and a system controller (e.g., system controller 50 shown in FIG. 2) connected to the storage unit 510. In an embodiment, the storage unit 510 can also include a power source (e.g., power source 60 shown in FIG. 2) for supplying power to the climate control system. In an embodiment, the status indication light 540 is provided extending along an edge of a surface of the climate controlled space 515, e.g., wrapped around a perimeter edge of the top wall or surface. As such, the status indication light 540 is highly visible to communicate a variety of container operational statuses and information.

In an embodiment, the system controller (e.g., system controller 50 shown in FIG. 2) can operate the status indication light 540 to indicate the logistical operation of the storage unit 510. For example, in an embodiment, the logistical operation can include a mission complete status and a mission ready status. The mission complete status can be an indication that the storage unit 510 has completed its deployment at the customer/deployment site, e.g., the cargo has been unloaded, and is ready for retrieval or collection from the customer/deployment site. As such, the system controller can operate the status indication light to emit a solid blue light. The mission ready status can be an indication that the storage unit 510 has been cleaned, sanitized, charged, and/or repaired and ready for deployment. As such, the system controller can operate the status indication light to emit a solid yellow light.

The indication of the mission complete status and the mission ready status can be automatically determined by the system controller. For example, the system controller (e.g., system controller 50) can determine that the storage unit 510 has completed its deployment, e.g., mission complete, based on at least one of a location of the storage unit, a measurement of a weight in the storage unit, e.g., removal of cargo from the climate controlled space 515, a time frame, e.g., after 5 hours, 10 hours, 15 hours, 20 hours, 1 day, or 2 days or the like (based on the rental or lease agreement by the customer) at the deployment site, and a setpoint for the climate control system, e.g., the climate control setpoint can be raised if not actively refrigerating cargo or the climate control system can be turned off.

The system controller can determine that the storage unit 510 is ready for deployment, e.g., mission ready, based on at least one of a location or locations of the storage unit, battery charge, or manual indication that the storage unit 510 is mission ready. When determining whether the storage unit 510 is mission ready based on the location, the storage unit 510 can track its position relative to a cleaning and/or sanitization facility, a repair facility, and/or warehouse for storage to be ready for deployment.

In an embodiment, the indication that the storage unit 510 is "mission complete" or "mission ready" can be provided manually via operation of a switch or button. As seen in FIG. 5, the switch or button 562 can be provided on the human-machine interface (HMI) 561 or on the keypad of the securing mechanism 518.

As such, when either the indication of "mission complete" or "mission ready" is determined by the system controller either manually or automatically, the status of the storage unit 510 is not only communicated via the status indication light 540, but also communicated to the monitoring network, e.g., the logistics operator network, such that the logistics operator can take the appropriate action, e.g., schedule collection, cleaning, sanitization, repair, shipment, deployment, or the like of the storage unit.

While the indication of the "mission complete" and "mission ready" for the storage unit has been discussed above including operation of the status indication light, in an embodiment, the selection of the mission complete and mission ready does not include the control of the status indication light 540, but rather, the remote status indication of the "mission complete" or "mission ready" status is sent to the logistics operator.

It is appreciated that the indication of "mission complete" or "mission ready" can also signal the system controller to take additional action based on the remote status indication.

For example, in an embodiment, when the remote status indication indicates a "mission complete" status, the system controller can shut down components to save energy, e.g., the compressor or fan of the climate control system, and/or perform system diagnostics to alert the logistics operator, e.g., state of charge/health of the batteries, compressor temperatures, condenser cooling efficiency, such that the logistics operator can make the necessary repairs.

Figure 6:
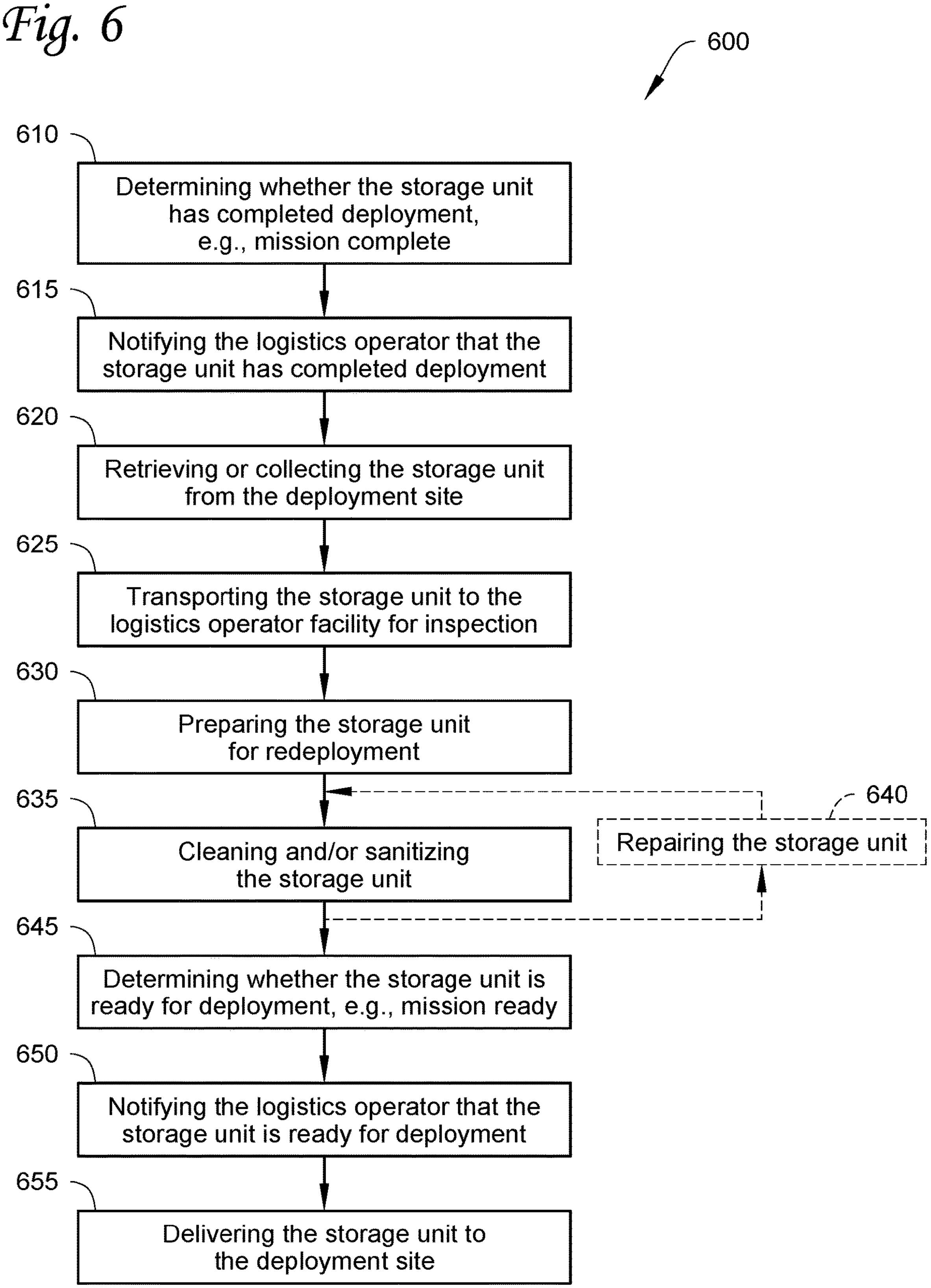
FIG. 6 is a flowchart of a method for managing logistical operation of the storage unit, according to an embodiment.

FIG. 6 illustrates an example reverse logistics process 600 for the storage unit 510 that utilizes the "mission complete" and "mission ready" status indications, in an embodiment. The reverse logistics process 600, e.g., movement of the storage unit after deployment, generally can be performed to reduce or mitigate the unintended dwell time of the storage unit (e.g., 10, 410, 510) at any given location. The storage unit as discussed below can be any of the storage units (e.g., 10, 410, 510) as discussed above.

In an embodiment, the conditions for use of the storage units (e.g., 10, 410, 510) can be provided in a lease or rental agreement prior to deployment of the storage unit. The lease or rental agreement can be between a customer, reusability facility, e.g., owner of the storage unit, logistics operator, e.g., person managing, tracking, and/or controlling logistical operation of the storage unit, or the like. In an embodiment, the conditions for the lease or rental agreement can include a period of time the customer can use the storage unit (e.g., 10, 410, 510), types of cargo that can be loaded in the storage unit, temperature constraints or energy consumption allowed for operating the storage unit (e.g., 10, 410, 510), or customer responsibilities for the storage unit (e.g., 10, 410, 510), e.g., responsibility for damage, repair, safe operation, charging, or the like. It is appreciated that the lease or rental agreement can be stored on the storage unit (e.g., 10, 410, 510) or accessible via the Internet and/or stored as a smart contract or smart legal contract, for example, that takes place on a blockchain or distributed ledger. For example, in an embodiment, the transaction for the lease or rental includes the compiled code for the smart contract, that is included in a block that is added to the blockchain, e.g., upon successful execution of the transaction. While not intended to be limiting in scope, but in order to understand the disclosure, the reusability facility and logistics operator are described below as the logistics operator.

At 610, after the storage unit (e.g., 10, 410, 510) is transported to a deployment site, the system controller (e.g., 50 in FIG. 2) is configured to determine whether the storage unit (e.g., 10, 410, 510) has completed its deployment at the customer/deployment site, e.g., mission complete status. For example, in an embodiment, the system controller (e.g., 50) can determine whether the cargo in the storage unit (e.g., 10, 410, 510) has been unloaded or if the storage unit (e.g., 10, 410, 510) is at the end date of the period of time the customer was allocated to use the storage unit (e.g., 10, 410, 510). In an embodiment, the system controller (e.g., 50) can also receive a signal from activation of the button or switch (e.g., 562 in FIG. 5) on the HMI (e.g., 561) or keypad, for example, which is manually operable by the customer to indicate that the storage unit has a "mission complete" status.

In an embodiment, the indication of the storage unit (e.g., 10, 410, 510) as having the "mission complete" status can also trigger the system controller (e.g., 50) to operate the status indication light (e.g., 40, 440, 540) to indicate that the storage unit has completed its deployment, e.g., mission complete. For example, in an embodiment, the system controller (e.g., 50) is configured to operate the status indication light (e.g., 40, 440, 540) to emit a solid yellow color, so that, for example, the shipping company collecting the storage unit 510 is notified of the correct storage unit (e.g., 10, 410, 510) for collection. The logistics process 600 then proceeds to 615.

At 615 when the system controller (e.g., 50) determines that the storage unit (e.g., 10, 410, 510) has completed deployment, e.g., mission complete, the system controller (e.g., 50) is configured to notify the logistics operator that the storage unit (e.g., 10, 410, 510) has completed deployment, e.g., via Internet or wireless communication protocols. The logistics operator can then instruct or notify a shipping company for pickup and receipt of the storage unit (e.g., 10, 410, 510) from the deployment site. As discussed above, in cases where a deployment site has multiple storage units (e.g., 10, 410, 510), the system controller (e.g., 50) is configured to operate the status indication light (e.g., 40, 440, 540) to indicate which of the storage units (e.g., 10, 410, 510), e.g., the correct storage unit, is intended to be picked-up and returned, e.g., back to the logistics operator. The logistics process 600 then proceeds to 620.

At 620, after the system controller (e.g., 50) has communicated the "mission complete" status of the storage unit (e.g., 10, 410, 510) to the logistics operator, the storage unit (e.g., 10, 410, 510) is retrieved or collected from the deployment site. The logistics process 600 then proceeds to 625.

At 625, the storage unit (e.g., 10, 410, 510) is transported from the deployment site and received at, for example, the logistics operator facility, for inspection of the storage unit (e.g., 10, 410, 510) to determine whether the storage unit can be reused or if the storage unit needs repair prior to redeployment. The inspection of the storage unit can include inspection of: the battery health of the power source, any physical damage to any of the components of the storage unit, for example, the climate control system, door, securing mechanism, or the like, correct operation of any of the sensor(s), correct operation of the climate control system, or the like. The logistics process 600 then proceeds to 630.

At 630, the storage unit (e.g., 10, 410, 510) is prepared for redeployment. The preparation of the storage unit (e.g., 10, 410, 510) can include the following:

At 635, the storage unit (e.g., 10, 410, 510) can be cleaned and sanitized at the logistics operator facility. The cleaning and sanitization can include removal of debris, dirt, and pathogens, disinfection using gases or UV light, cleaning with chemicals, or the like. The logistics process 600 then proceeds to 640.

At 640, if at 625, during the inspection of the storage unit (e.g., 10, 410, 510), it was determined that any repairs were needed, the customer can be alerted of the required repairs including estimate time and cost, pursuant to the lease or rental agreement. In an embodiment, the logistics operator can be responsible for the repair and costs associated with the repair. If acceptable, the customer (or logistics operator) can authorize the repairs to the storage unit.

The repairing of the storage unit (e.g., 10, 410, 510) can include the following:

Transporting the storage unit (e.g., 10, 410, 510) for delivery of the storage unit at a repair facility.

Repairing the storage unit (e.g., 10, 410, 510).

After repair to the storage unit (e.g., 10, 410, 510) has been completed, notifying the logistics operator to schedule and collect the storage unit for delivery to the logistics operator facility.

Collecting and delivering the storage unit (e.g., 10, 410, 510) to the logistics operator facility.

The logistics process 600 then proceeds to 645.

At 645, after the storage unit (e.g., 10, 410, 510) is received after preparation for redeployment, the system controller (e.g., 50 in FIG. 2) is configured to determine whether the storage unit (e.g., 10, 410, 510) is ready for redeployment, e.g., mission ready status. For example, in an embodiment, the system controller (e.g., 50) can determine whether the storage unit (e.g., 10, 410, 510) has been cleaned, sanitized, and/or repaired. In an embodiment, the system controller (e.g., 50) can also receive a signal from activation of the button or switch (e.g., 562 in FIG. 5) on the HMI (e.g., 561) or keypad, for example, which is manually operable by the customer to indicate that the storage unit has a "mission ready" status.

In an embodiment, the indication of the storage unit (e.g., 10, 410, 510) as having the "mission ready" status can also trigger the system controller (e.g., 50) to operate the status indication light (e.g., 40, 440, 540) to indicate that the storage unit is ready for deployment, e.g., mission ready. For example, in an embodiment, the system controller (e.g., 50) is configured to operate the status indication light (e.g., 40, 440, 540) to emit a solid green color, so that, for example, the shipping company collecting the storage unit 510 is notified of the correct storage unit (e.g., 10, 410, 510) for collection. The logistics process 600 then proceeds to 650.

At 650 when the system controller (e.g., 50) determines that the storage unit (e.g., 10, 410, 510) is ready for deployment, e.g., mission ready, the system controller (e.g., 50) is configured to notify the logistics operator that the storage unit (e.g., 10, 410, 510) is ready for deployment, e.g., via Internet or wireless communication protocols. The logistics operator can then instruct or notify a shipping company for pickup and delivery of the storage unit (e.g., 10, 410, 510) to the deployment site per the existing lease or rental contract or a new lease or rental contract. As discussed above, in cases where a warehouse has multiple storage units (e.g., 10, 410, 510), the system controller (e.g., 50) is configured to operate the status indication light (e.g., 40, 440, 540) to indicate which of the storage units (e.g., 10, 410, 510), e.g., correct storage unit, is intended to be picked-up and delivered, e.g., to the customer deployment site. The logistics process 600 then proceeds to 655.

At 655, the storage unit (e.g., 10, 410, 510) can be delivered to the customer deployment site. In an embodiment, after the storage unit (e.g., 10, 410, 510) has been loaded with cargo, the system controller (e.g., 50) can operate the status indication light (e.g., 40, 440, 540) to indicate that the storage unit (e.g., 10, 410, 510) is actively cooling or heating cooling, e.g., operating the status indication light to emit a solid blue color. The logistics process 600 then returns to 610.

Optionally, pursuant to the lease or rental contract, after the storage unit (e.g., 10, 410, 510) has been loaded with cargo, the system controller (e.g., 50) can be configured to notify the logistics operator for pickup and delivery of the storage unit (e.g., 10, 410, 510) to further downstream customers, e.g., shipment of cargo product from manufacturer to customer or from hospital to surgical hospital.

It is appreciated that the storage unit (e.g., 10, 410, 510) can be charged while at the repair facility or charged at the logistics operator facility. Additionally, the storage unit (e.g., 10, 410, 510) can be stored along different steps in the reverse logistics operation and stored at a set price, e.g., per the lease or rental agreement, for example, at a warehouse or other storage facility of the logistics operator.

As such, the storage unit (e.g., 10, 410, 510) is configured to determine a mission complete status or a mission ready status to reduce dwell time of the storage unit. For example, in an embodiment, the storage unit (e.g., 10, 410, 510) can be made "self-aware," e.g., via telematics or sensing of operation condition of the storage unit, or manually triggered at various stages of the reverse logistics process so that the storage unit does not sit unattended for long periods of time, e.g., dwell time at the deployment site, at the repair facility, at the warehouse, or the like. For example, in an embodiment, the storage unit can be configured as a beacon for location and ranging. In an embodiment, the storage unit can be pinged, e.g., by the customer or logistics operator, and the status indication light can be used to provide feedback, e.g., indication of the selected storage unit. For example, the pinging can be a SMS text message or webpage or application that can be used to communicate with the storage unit. In an another embodiment, a button or switch can be provided on the storage unit to generate a feedback status for the storage unit to alert the logistics operator of the location of the storage unit. In yet another embodiment, a transportation condition of the storage unit can be sensed, e.g., lifting of the storage unit by weight sensors, to generate a location status of the storage unit. By removing or reducing the unintended dwell time, the useful value of the storage unit can be improved and the flow of temperature controlled goods can be improved, since the cargo in the storage unit typically requires immediate attention for unloading and/or delivery so that the storage unit can be redeployed, e.g., utilization of the storage unit can be improved.

It is appreciated that in an embodiment, since the storage unit (e.g., 10, 410, 510) is "self-aware," the system controller can be configured to automatically trigger other notifications being sent to the logistics operator. For example, when the storage unit needs servicing, e.g., when the system controller determines that the compressor is not operating correctly, the system controller can notify the logistics operator for collection and repair. Additionally, since the storage unit (e.g., 10, 410, 510) is able to indicate when it is "mission ready" or "mission complete" and alert the logistics operator to more efficiently utilize the use of the storage unit, the dwell time can be eliminated.

In another embodiment, a mesh network can be created between the storage units that are loaded in the transport unit or provided in a warehouse or the like that are grouped together, e.g., based on the bill of lading, delivery address, proximity, or the like. For example, the storage units can include telematics or proximity sensors, e.g., RF sensors, to group the storage units together that are within a certain distance from each other, such that the storage units in the mesh network can communicate with a main controller, e.g., at the logistics operator, to aggregate any of the necessary information, e.g., cargo weight, total weight, battery charge, dwell time, or the like.

Based on the information from the mesh network, the logistics operator can determine loading instructions and/or deployment strategies for the storage units. For example, since the storage units can be made aware of their dwell time and battery charge and communicate the same, the main controller of the logistics operator can determine the loading and/or deployment strategy of the storage units. In an embodiment, the storage units with the longest dwell time and/or lowest battery charge can be used for customers based on the customer's needs, e.g., if local delivery or a short rental term, the storage unit with the lowest battery charge could be deployed. Such indication can be provided by status indication lights or the like to indicate the order in which the storage units should be deployed, e.g., by color, frequency of flashes, or the like.

While the storage unit, status indication light, and system controller are described above with respect to specific embodiments, it is understood that such disclosure is not intended to be limiting in scope, but provided to provide examples of the disclosure. Not only can the above described embodiments be combined to provide a highly visible indication of the system operation statuses, faults/errors, or logistical operation statuses, the storage unit can be configured in various ways to communicate the information or operation condition to the necessary parties. As such, the storage unit is self-aware of its operating condition and able to communicate the same for improved utilization of the storage unit.

Aspects

It is to be appreciated that any one of aspects 1-13 can be combined together and/or with aspects 14-15.

Aspect 1. An electrically powered portable self-contained climate controlled storage unit, comprising:

- a base comprising an enclosure, wherein the base is configured to support the self-contained climate controlled storage unit;
- a climate controlled space affixed above the base;
- a climate control system for providing climate control to the climate controlled space, at least a portion of the climate control system provided in the enclosure;
- at least one status indication light extending along an edge of a surface of the self-contained climate controlled storage unit; and
- a system controller configured to operate the at least one status indication light based on at least one of a system operation status of the self-contained climate controlled storage unit or a logistical operation status of the self-contained climate controlled storage unit.

Aspect 2. The electrically powered portable self-contained climate controlled storage unit according to Aspect 1, wherein the at least one status indication light is provided around a perimeter edge of a top wall of the climate controlled space.

Aspect 3. The electrically powered portable self-contained climate controlled storage unit according to any of Aspects 1 or 2, wherein the at least one status indication light is provided around a perimeter edge of a door for opening and/or closing the climate controlled space.

Aspect 4. The electrically powered portable self-contained climate controlled storage unit according to any of Aspects 1-3, further comprising one or more batteries for supplying power to the climate control system, wherein the one or more batteries is provided in the enclosure of the base.

Aspect 5. The electrically powered portable self-contained climate controlled storage unit according to Aspect 4, wherein the system controller is configured to operate the at least one status indication light in at least two operation modes, the at least two operation modes including a first operation mode for the self-contained climate controlled storage unit being in an idle state and a second operation mode for the self-contained climate controlled storage unit being in an active climate control state, wherein in the first operation mode, the at least one status indication light is activated to emit varying colors based on a battery state of charge of the one or more batteries, and in the second operation mode, the at least one status indication light is activated based on the climate control system maintaining a setpoint and the battery state of charge of the one or more batteries.

Aspect 6. The electrically powered portable self-contained climate controlled storage unit according to Aspect 4, wherein the system controller is configured to operate the at least one status indication light to emit a warning signal when the self-contained climate controlled storage unit is in an alarm condition or a critical operation condition.

Aspect 7. The electrically powered portable self-contained climate controlled storage unit according to Aspect 6, further comprising an audible alert when the self-contained climate controlled storage unit is in the critical operation condition.

Aspect 8. The electrically powered portable self-contained climate controlled storage unit according to Aspect 6, wherein the alarm condition is at least one of a door open event, setpoint deviation, failure of the one or more batteries, and failure of or imminent failure of a component of the climate control system.

Aspect 9. The electrically powered portable self-contained climate controlled storage unit according to Aspect 6, wherein the critical operation condition is at least one of damage or potential for damage to the self-contained climate controlled storage unit, the storage unit not being at a predetermined location, and a measured value of the storage unit is not within a predetermined value.

Aspect 10. The electrically powered portable self-contained climate controlled storage unit according to any of Aspects 1-9, wherein the logistical operation status of the self-contained climate controlled storage unit includes a mission complete status and a mission ready status, wherein the system controller is configured to operate the at least one status indication light based on the mission complete status and the mission ready status.

Aspect 11. The electrically powered portable self-contained climate controlled storage unit according to Aspect 10, wherein the system controller includes a manual operation to indicate the mission complete status and the mission ready status, wherein the manual operation includes an operation of a switch or button on a human machine interface on the self-contained climate controlled storage unit.

Aspect 12. The electrically powered portable self-contained climate controlled storage unit according to Aspect 10, wherein the system controller is further configured to automatically monitor the mission complete status and the mission ready status based on at least one of a location of the self-contained climate controlled storage unit, a measurement of a sensor on the self-contained controlled storage unit, a time frame, or a setpoint for control of the climate control system.

Aspect 13. The electrically powered portable self-contained climate controlled storage unit according to Aspect 10, wherein the system controller is further configured to operate the at least one status indication light to locate the self-contained climate controlled storage unit.

Aspect 14. A method for managing logistical operation for an electrically powered portable self-contained climate controlled storage unit, the electrically powered portable self-contained climate controlled storage unit including a base comprising an enclosure, a climate controlled space affixed above the base, a climate control system for providing climate control to the climate controlled space, the climate control system provided in the enclosure, at least one status indication light extending along an edge of a surface of the self-contained climate controlled storage unit, and a system controller configured to control operation of the electrically powered portable self-contained climate controlled storage unit, the method comprising:

the system controller notifying a logistics operator that the self-contained climate controlled storage unit is ready for deployment, wherein the notifying the logistics operator includes the system controller operating the at least one status indication light to indicate that the self-contained climate controlled storage unit is ready for deployment;

after the self-contained climate controlled storage unit is transported to a deployment site, the system controller notifying the logistics operator that the self-contained climate controlled storage unit has completed deployment, wherein the notifying the logistics operator includes the system controller operating the at least one status indication light to indicate that the self-contained climate controlled storage unit has completed the deployment; and after the self-contained climate controlled storage unit is received from the deployment site and prepared for redeployment, the system controller notifying the logistics operator that the self-contained climate controlled storage unit is ready for deployment.

Aspect 15. The method according to Aspect 14, further comprising the system controller notifying the logistics operator when the self-contained climate controlled storage unit needs servicing.

Aspect 16. The method according to any of Aspects 14-15, wherein the system controller is configured to automatically determine that the self-contained climate controlled storage unit has completed deployment.

Aspect 17. The method according to any of Aspects 14-16, wherein when a plurality of self-contained climate controlled storage units are provided, the method further comprising the system controller notifying the logistics operator which self-contained climate controlled storage unit is to be transported.

Aspect 18. The method according to any of Aspects 14-17, wherein the determination by the system controller that the self-contained climate controlled storage unit is ready for the deployment or has completed the deployment is by activation of a button or switch.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. An electrically powered portable self-contained climate controlled storage unit, comprising:

a base comprising an enclosure, wherein the base is configured to support the self-contained climate controlled storage unit;

a climate controlled space affixed above the base;

a climate control system for providing climate control to the climate controlled space, at least a portion of the climate control system provided in the enclosure;

at least one status indication light having a length direction extending substantially along at least a near entirety of a length of at least one side of a surface of the self-contained climate controlled storage unit; and a system controller configured to operate the at least one status indication light based on at least one of a system operation status of the self-contained climate controlled storage unit or a logistical operation status of the self-contained climate controlled storage unit.

2. The electrically powered portable self-contained climate controlled storage unit according to claim 1, wherein the at least one status indication light is provided around a perimeter edge of a top wall of the climate controlled space.

3. The electrically powered portable self-contained climate controlled storage unit according to claim 1, wherein the at least one status indication light is provided around a perimeter edge of a door for opening and/or closing the climate controlled space.

4. The electrically powered portable self-contained climate controlled storage unit according to claim 1, further comprising one or more batteries for supplying power to the climate control system, wherein the one or more batteries is provided in the enclosure of the base.

5. The electrically powered portable self-contained climate controlled storage unit according to claim 4, wherein the system controller is configured to operate the at least one status indication light to emit a warning signal when the self-contained climate controlled storage unit is in an alarm condition or a critical operation condition.

6. The electrically powered portable self-contained climate controlled storage unit according to claim 5, further comprising an audible alert when the self-contained climate controlled storage unit is in the critical operation condition.

7. The electrically powered portable self-contained climate controlled storage unit according to claim 5, wherein the alarm condition is at least one of a door open event, setpoint deviation, failure of the one or more batteries, and failure of or imminent failure of a component of the climate control system.

8. The electrically powered portable self-contained climate controlled storage unit according to claim 5, wherein the critical operation condition is at least one of damage or potentially damaged to the self-contained climate controlled storage unit, the self-contained climate controlled storage unit not being at a predetermined location, and a measured value of the self-contained climate controlled storage unit is not within a predetermined value.

9. The electrically powered portable self-contained climate controlled storage unit according to claim 1, wherein the logistical operation status of the self-contained climate controlled storage unit includes a mission complete status and a mission ready status, wherein the system controller is configured to operate the at least one status indication light based on the mission complete status and the mission ready status.

10. The electrically powered portable self-contained climate controlled storage unit according to claim 9, wherein the system controller includes a manual operation to indicate the mission complete status and the mission ready status, wherein the manual operation includes an operation of a switch or button on a human machine interface on the self-contained climate controlled storage unit.

11. The electrically powered portable self-contained climate controlled storage unit according to claim 9, wherein the system controller is further configured to automatically monitor the mission complete status and the mission ready status based on at least one of a location of the self-contained climate controlled storage unit, a measurement of a sensor on the self-contained controlled storage unit, a time frame, or a setpoint for control of the climate control system.

12. The electrically powered portable self-contained climate controlled storage unit according to claim 9, wherein the system controller is further configured to operate the at least one status indication light to locate the self-contained climate controlled storage unit.

13. The electrically powered portable self-contained climate controlled storage unit according to claim 1, wherein the at least near entirety of the length of the at least one side is between at least 80% and about at least 100% of the length of the at least one side.

14. The electrically powered portable self-contained climate controlled storage unit according to claim 13, wherein the at least near entirety of the length of the at least one side is 90% of the length of the at least one side.

15. An electrically powered portable self-contained climate controlled storage unit, comprising:

a base comprising an enclosure, wherein the base is configured to support the self-contained climate controlled storage unit;

a climate controlled space affixed above the base;

a climate control system for providing climate control to the climate controlled space, at least a portion of the climate control system provided in the enclosure;

at least one status indication light extending along an edge of a surface of the self-contained climate controlled storage unit; and a system controller configured to operate the at least one status indication light based on at least one of a system operation status of the self-contained climate controlled storage unit or a logistical operation status of the self-contained climate controlled storage unit, further comprising one or more batteries for supplying power to the climate control system, wherein the one or more batteries is provided in the enclosure of the base, wherein the system controller is configured to operate the at least one status indication light in at least two operation modes, the at least two operation modes including a first operation mode for the self-contained climate controlled storage unit being in an idle state and a second operation mode for the self-contained climate controlled storage unit being in an active climate control state, wherein in the first operation mode, the at least one status indication light is activated to emit varying colors based on a battery state of charge of the one or more batteries, and in the second operation mode, the at least one status indication light is activated based on the climate control system maintaining a setpoint and the battery state of charge of the one or more batteries.

16. A method for managing logistical operation for an electrically powered portable self-contained climate controlled storage unit, the electrically powered portable self-contained climate controlled storage unit including a base comprising an enclosure, a climate controlled space affixed above the base, a climate control system for providing climate control to the climate controlled space, the climate control system provided in the enclosure, at least one status indication light having a length direction extending substantially along at least a near entirety of a length of at least one edge of a surface of the electrically powered portable self-contained climate controlled storage unit, and a system controller configured to control operation of the electrically powered portable self-contained climate controlled storage unit, the method comprising:

the system controller notifying a logistics operator that the electrically powered portable self-contained climate controlled storage unit is ready for deployment, wherein the notifying the logistics operator includes the system controller operating the at least one status indication light to indicate that the electrically powered portable self-contained climate controlled storage unit is ready for deployment;

after the electrically powered portable self-contained climate controlled storage unit is transported to a deployment site, the system controller notifying the logistics operator that the electrically powered portable self-contained climate controlled storage unit has completed deployment, wherein the notifying the logistics operator includes the system controller operating the at least one status indication light to indicate that the electrically powered portable self-contained climate controlled storage unit has completed the deployment; and after the electrically powered portable self-contained climate controlled storage unit is received from the deployment site and prepared for redeployment, the system controller notifying the logistics operator that the electrically powered portable self-contained climate controlled storage unit is ready for deployment.

17. The method according to claim 16, further comprising the system controller notifying the logistics operator when the electrically powered portable self-contained climate controlled storage unit needs servicing.

* * * * *